United States Patent [19]

Ritola

[11] Patent Number: 5,390,778
[45] Date of Patent: Feb. 21, 1995

[54] APPARATUS FOR EVEN ENDING LUMBER

[75] Inventor: Edward W. Ritola, LaCenter, Wash.

[73] Assignee: U.S. Natural Resources, Inc., Vancouver, Wash.

[21] Appl. No.: 186,763

[22] Filed: Jan. 25, 1994

[51] Int. Cl.⁶ .............................................. B65G 47/26
[52] U.S. Cl. ............................ 198/456; 144/246 B
[58] Field of Search ..................... 198/456, 786, 787; 144/245 A, 246 B

[56] References Cited

U.S. PATENT DOCUMENTS

| | | | |
|---|---|---|---|
| 2,863,551 | 12/1958 | Bilocq | 198/456 |
| 3,638,792 | 2/1972 | Bilocq | 144/245 A X |
| 4,180,109 | 12/1979 | Heikkinen | 144/246 B X |

FOREIGN PATENT DOCUMENTS 1102745  7/1984  U.S.S.R. ................ 198/456

Primary Examiner—Cheryl L. Gastineau
Attorney, Agent, or Firm—Robert L. Harrington

[57] ABSTRACT

An apparatus for aligning the ends of lumber pieces on a common register during conveyance of the lumber pieces. A lug type chain conveyor has wheel sets positioned between adjacent chains. The wheel sets have multiple freely rotating idler wheels positioned at an angle to the direction of conveyance of the conveyor. The periphery of the wheels extend above the chains a nominal distance. The lumber pieces, as they are being conveyed on the conveyor, engage the idler wheels of the wheel sets causing the idler wheels to rotate. The rotation of the idler wheels urge the lumber piece to move transverse to the travel direction of the conveyor to position the end of the lumber pieces in abutment with a register at the side of the conveyor.

9 Claims, 3 Drawing Sheets

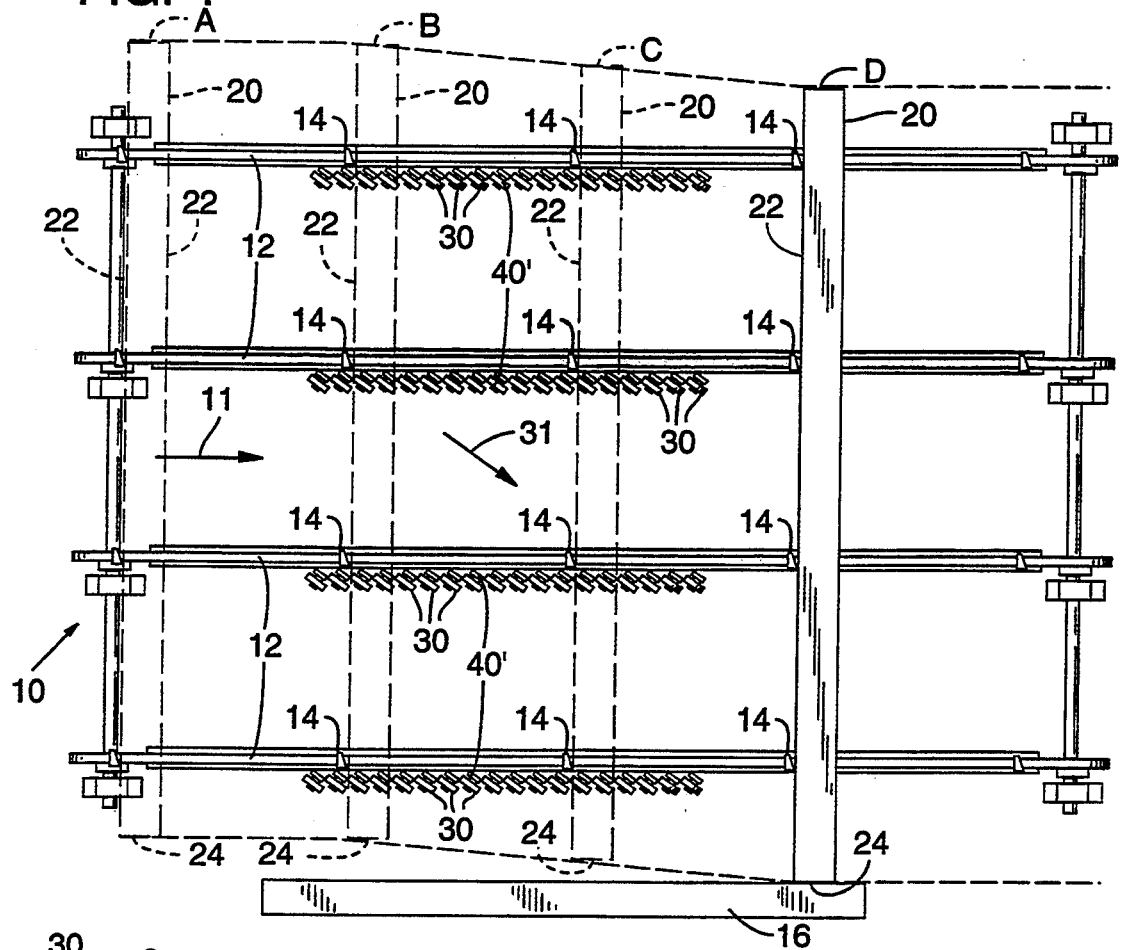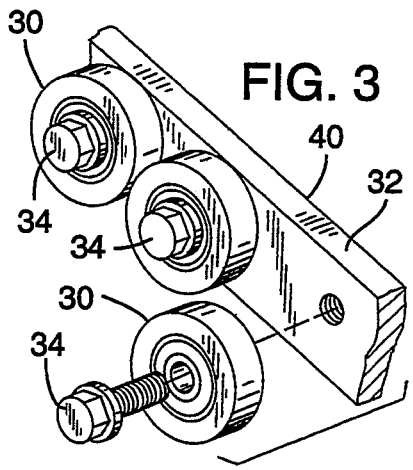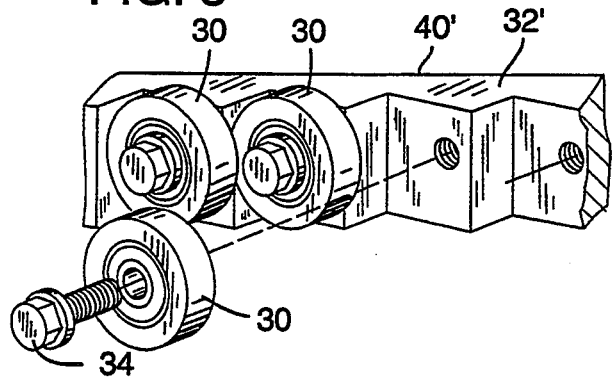

APPARATUS FOR EVEN ENDING LUMBER

FIELD OF THE INVENTION

This invention relates to apparatus for orienting lumber pieces and in particular it relates to apparatus for even ending pieces of lumber as they are being conveyed.

BACKGROUND OF THE INVENTION

Lumber mills process logs into material such as lumber pieces. The mills have many stations that perform different operations on the logs and the resulting lumber pieces generated from the logs. The lumber pieces as they exit one station are conveyed to a next station where further processing on the lumber pieces is performed. The lumber pieces are thus conveyed from one processing station to the next.

One of the objectives in the conveyance of the lumber pieces from station to station is to establish the proper orientation of the lumber pieces for the next processing station. For example, certain processes require the lumber pieces to be conveyed laterally, i.e., crossway to the direction of conveyance and it is desirable or even necessary in most cases that one end of the lumber pieces be positioned in a specific travel path as they enter the processing station. A common method for end positioning the lumber pieces (referred to as "even ending") is to provide a side board or fence along the side of the conveyor and providing side shifting of the lumber pieces into the fence.

One type of conveyor utilized in conveying the lumber pieces is the lug type conveyor that has upstanding lugs that engage the side edge of the lumber piece to be conveyed. The lumber pieces are thus placed cross way on the conveyor and are conveyed in this manner to the next station. The position of the lumber pieces on the conveyor most likely will vary from piece to piece. The lumber pieces thus must be moved transverse to the travel direction of the conveyor for abutment against a fence to properly position each lumber piece in the desired position for the subsequent processing station.

Existing conveyors have utilized long rollers having their rotational axis substantially parallel to the direction of conveyor movement. The rollers are rotated, e.g. by a motor to urge movement of the pieces crossway to the direction of conveyor movement. The length of the rollers insures sufficient contact with the pieces as they are also being conveyed by the lugs of the conveyor to achieve the desired lateral movement, that is, so the ends of the lumber pieces each have an end in abutment with a known register. The long rollers are mounted in the conveyor so that the rolls will just engage the underside of the lumber piece as it is being conveyed by the lug type conveyor. The powered rollers are initially expensive, requiring some manner of powering the rollers e.g. by individual motors, and also incur added maintenance expense over the life of the conveyor.

The present invention provides transverse positioning of the lumber pieces to align or even end the lumber pieces without the expensive powered rollers of the past.

BRIEF SUMMARY OF THE INVENTION

A preferred embodiment of the apparatus for even ending lumber during conveyance has multiple idler wheels mounted strategic to a lug type conveyor that conveys lumber pieces from one processing station to the next processing station. The wheels are narrow in width and each provides contact with the lumber piece over a short duration, but the many wheels in cooperation provide the necessary long duration of contact. The idler wheels are mounted such that the periphery of the idler wheels will be engaged by the underside of the lumber piece as the lumber is conveyed by the conveyor. The idler wheels are mounted at an angle relative to the directional movement of the conveyor such that the rotational directional movement of wheels are at a relatively shallow (low) angle to the directional movement of the conveyor. The idler wheels are rotatably mounted on low friction bearings so there is a minimal resistance to rotation. As the lumber piece being conveyed by the lug type conveyor engages a wheel or wheels, the lumber piece will cause the wheels to rotate and the wheels being at an angle to the direction of conveyance of the conveyor will urge the lumber pieces to shift or move transverse to the travel direction of the conveyor according to the angle at which the wheels are mounted.

Refer now to the drawings and the detailed description for a complete understanding of the invention.

BRIEF DESCRIPTION OF THE DRAWINGS

FIG. 3 is a partial view of a wheel set of the conveyor of FIG. 1;

FIG. 4 is an alternate embodiment of the conveyor of the present invention;

FIG. 5 is a partial view of wheel set of the conveyor of FIG. 4;

DESCRIPTION OF THE PREFERRED EMBODIMENT

Figure 1:
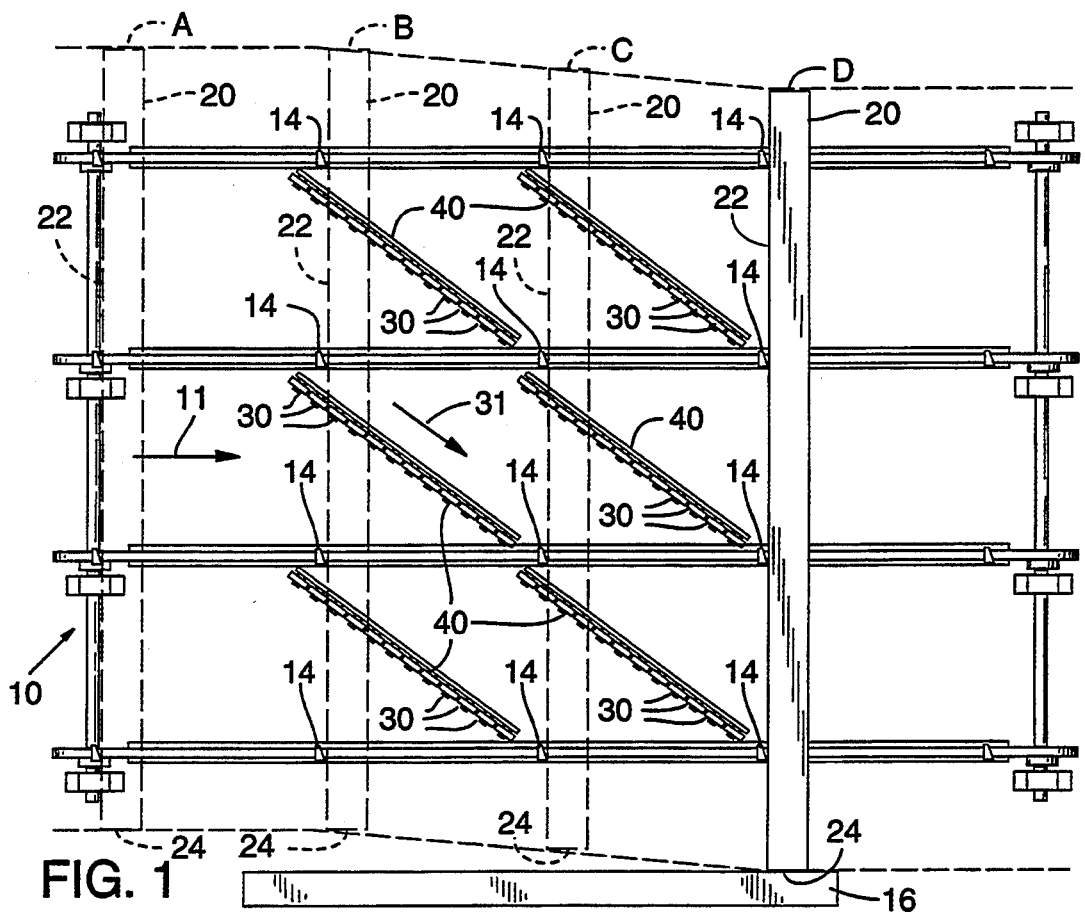
FIG. 1 is a top plan view of a conveyor of the present invention.
Figure 2:
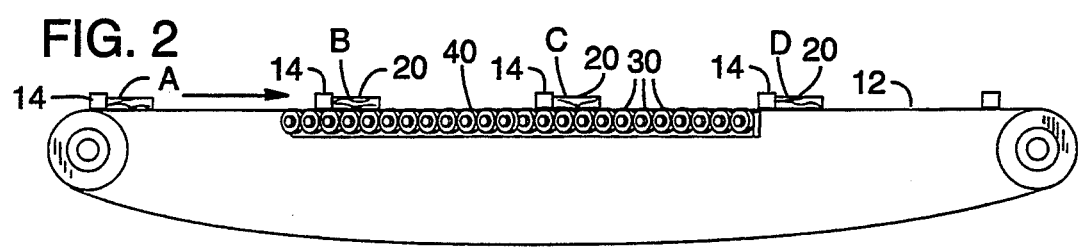
FIG. 2 is a side view of the conveyor of FIG. 1.

Refer now to FIGS. 1 and 2 of the drawings which illustrates a preferred embodiment of a conveyor 10 for conveying lumber pieces 20 from one processing station to another. The conveyor 10 is a chain type conveyor that has multiple chains 12 spaced across its width. The chains have upstanding lugs 14 that will engage the sides 22 of the lumber pieces 20 to propel the lumber pieces along a directed path which the chains 12 traverse as indicated by arrow 11. The conveyor 10 has a side register 16, such as a bumper or fence mounted on one side of the conveyor that extends substantially along its length and parallel to the direction of conveyance 11 as shown. The bumper 16 extends upward above the plane of the chains 12 as necessary to provide abutment for lumber pieces 20.

The conveyor 10 has multiple sets of non-powered, freely rotating idler wheels 30 mounted between the chains 12. As shown in FIG. 3, each set has multiple idler wheels 30 rotatably mounted on a rail 32 on mounting studs 34 in a known conventional manner. The idler wheels have bearings that are low friction to permit rotation of the wheel 30 with minimum resistance. The wheels 30 in this embodiment are relatively narrow in width and small in diameter. The wheel 30 has a width of about $\frac{3}{8}$ inch and a diameter of about 2-$\frac{1}{4}$ inch. The studs 34 serve as spindles and thus define the axis of rotation of the idler wheels 30. The rail 32 with the multiple wheels 30 mounted thereon will be referred to as a wheel set 40. Each wheel set 40 is mounted to the conveyor 10 by conventional mounting methods with each wheel set being between adjacent chains 12.

In this embodiment, the wheel sets 40 are mounted in rows across the width of the conveyor 10. The wheel sets 40 are preferably aligned in each row, although it is not essential to accomplish the intended lateral (transverse) movement of the lumber piece 20 which is later explained. FIG. 1 illustrates two rows of wheel sets 40 mounted to the conveyor with three wheel sets per row. The number of rows of wheel sets 40 as well as the number of wheel sets 40 per row may be varied to suit the requirements. A wider conveyor for example may have more wheel sets per row. Similarly, the number of rows may be varied to suit the requirements. Additionally, the number of wheels 30 per wheel set 40 may be varied to suit spatial requirements or to suit the amount of transverse movement of the lumber piece(s) to establish the end of the lumber piece on the side register.

Figure 6:
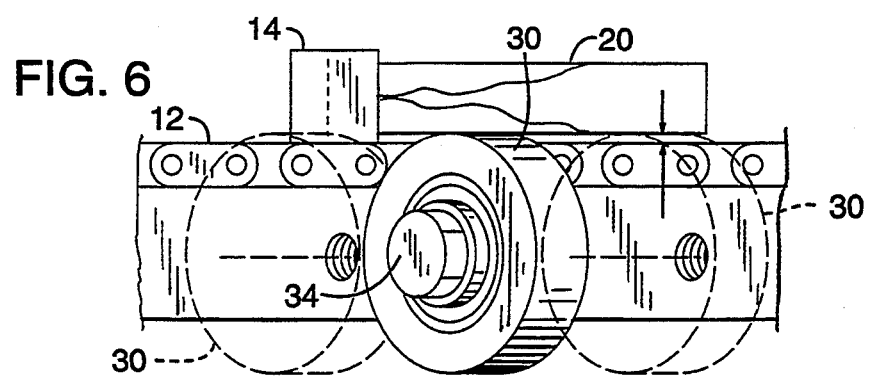
FIG. 6 is a view showing the relation of the wheel set of FIG. 3 and the chain of the conveyor of FIG. 1.

As seen in FIG. 1, the wheel sets 40 are mounted at an angle to the travel direction (directed path indicated by arrow 11) of the conveyor 10 and thus the wheels 30 when rotated will have a rotational travel direction that is at an angle to the travel direction of the chains 12 of the conveyor 10. As shown in FIG. 6, the wheel sets 40 are mounted to the conveyor 10 so that the periphery of each wheel 30 extends into the directed path of the conveyor 10 (above the plane of the chains 12) a nominal distance as for example ¼ inch. The portion of the conveyor 10 on which the wheel sets 40 are mounted defines an aligning or registering station or section.

Referring again to FIGS. 1 and 2, a lumber piece 20 received on the conveyor 10 is transported by the chains 12 in the direction indicated by arrow 11. The lugs 14 of the chain 12 engage the side edge 22 of the lumber piece 20 to provide a positive engagement between the chains 12 and the lumber piece 20. For purposes of illustration and explanation, only one lumber piece 20 will be referred to and is shown in four positions on the conveyor 10, the positions being designated as A, B, C, and D. Position A indicates the lumber piece 20 approaching the aligning section of the conveyor 10 and being engaged by the lugs 14 to positively transport the lumber piece 20 through the aligning section. Position B shows the lumber piece 20 being engaged and transported by the conveyor 10 and is traveling over the wheel sets 40 that are positioned between adjacent chains 12.

As the lumber piece 20 is propelled by the lugs 14 of the chain 12 and encounters the wheel sets 40, the lugs 14 will force the lumber piece 20 onto the wheel sets 40. Recall that the periphery of each wheel 30 extends upward a nominal distance above the chain 12 (see FIG. 6). The lumber piece 20 will thus be elevated a slight amount and the underside of the lumber piece 20 will be in engagement with the wheels 30. As the lumber piece 20 is forced along the travel path and in engagement with the wheels 30, the lumber piece will force the wheels to rotate. Recall that the wheels 30 have bearings that provide minimum resistance to rotation and therefore the moving contact of the underside of the lumber piece 20 with the wheel(s) 30 will cause the wheel(s) 30 to rotate. As the wheels 30 rotate, the lumber piece will be urged to follow the wheel rotation and thereby move transverse to the travel direction of the conveyor 10 toward the side register 16.

The urging of the rotating wheels 30 in engagement with the underside of the lumber piece 20 provides sufficient force to overcome the force resisting the transverse movement of the lumber piece 20. The resistive force is due mainly to the lugs 14 being in engagement with the side 22 of the lumber piece 20 since the lumber piece 20 has been elevated onto the wheels 30. The lumber piece 20 as it is being conveyed by the lugs 14 will be moved transverse to the travel direction of the chains 12 substantially in the angled direction of the wheels 30 of the wheel sets 40 as generally indicated by arrow 31.

Position C shows the lumber piece progressing along the conveyor 10 and as it progresses, the lumber piece is moved closer to the side register 16 by the action of the wheels sets 40. Position D shows the lumber piece 20 moved further along the conveyor 10 and has been moved transverse to the travel direction (directed path as indicated by arrow 11) of the conveyor 10 and has the end 24 of the lumber piece in abutment with the side register 16. The lumber piece 20 is thus positioned in a desired position for the next station.

FIGS. 4 and 5 illustrate an alternate arrangement of wheel sets 40'. The wheel sets 40', like wheel sets 40, have multiple wheels 30 rotatably mounted to a support rail 32' by mounting studs 34. The arrangement of the wheel sets 40' is best seen in FIG. 5. The wheels sets 40' are mounted to the conveyor 10 in a conventional manner with the wheel sets 40' being substantially parallel to the chains 12 of the conveyor 10. Each wheel 30 of the wheel set 40' is however at an angle to the travel direction (arrow 11) of the conveyor 10 since the wheels 30 are mounted at an angle to the rail 32'. The wheel sets 40' are mounted so that the periphery of the wheels 30 will extend upward above the chains 12, again at a nominal distance. The portion of the conveyor 10 on which the wheel sets 40' are mounted defines an aligning or registering station.

The position of the lumber piece 20 on the conveyor 10 in FIG. 4 is again designated by A, B, C, and D. Position A indicates the lumber piece 20 just prior to entry onto the aligning station. The lumber piece 20 is engaged by the lugs 14 to positively transport the lumber piece 20 through the station. Position B shows the lumber piece 20 being transported by the conveyor 10 and is traveling over the wheel sets 40' that are positioned between adjacent chains 12. As the lumber piece 20 is propelled by the lugs 14 of the chain 12 and encounters the wheel sets 40', the lugs 14 will force the lumber piece 20 onto the wheel sets 40'.

Recall that the periphery of each wheel 30 extends upward a nominal distance above the chain 12. The lumber piece 20 will thus be elevated a slight amount and the underside of the lumber piece 20 will be in engagement with the wheels 30. As the lumber piece 20 is forced along the travel path and in engagement with the wheels 30, the lumber piece will force the wheels to rotate. As the wheels 30 rotate, the lumber piece will be urged toward the side register 16. The lumber piece 20 will be moved transverse to the travel direction of the chains 12 substantially in the angled direction of the wheels 30 of the wheel sets 40'. Position C shows the lumber piece progressing along the conveyor 10 and as it progresses, the lumber piece is moved closer to the side register 16 by the action of the wheels sets 40'. Position D shows the lumber piece 20 moved further along the conveyor 10 and has been moved transverse to the travel direction (directed path as indicated by arrow 11) of the conveyor 10 and has the end 24 of the lumber piece in abutment with the side register 16. The lumber piece 20 is thus positioned in a desired position for the next station.

While only one lumber piece 20 has been shown on the conveyor 10 in FIGS. 1, 2 and 4, it will be appreciated that the lumber pieces 20 received on the conveyor 10 will not be received with the ends 24 in the same position. The lumber pieces will have ends 24 at varying distances from the register 16. Sufficient wheel sets 40 (40') are provided to move the lumber piece 20 transversely as the lumber piece is being conveyed to place the end 24 against the register 16 regardless of the initial position of the lumber piece 20. Lumber pieces 20 that are initially close to the register 16 will most likely be moved against the register 16 before exiting the aligning (registering) station and as the lumber piece is conveyed will simply slide over the wheel sets 40.

Figure 7:
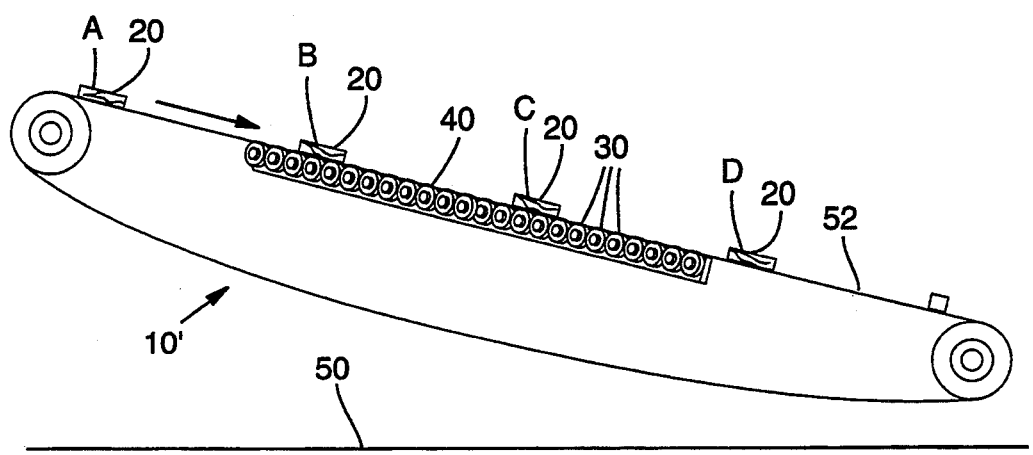
FIG. 7 is a view of another embodiment of the conveyor of the present invention.

Refer now to FIG. 7 which illustrates another embodiment of a conveyor 10' of the present invention. As shown, the conveyor 10' is inclined at an angle to a horizontal plane 50. The conveyor 10' is a chain type conveyor that has multiple chains 52 spaced across its width similar to that of conveyor 10 of FIGS. 1 and 2. The chains 52 do not, however, have any positive drive lugs. The conveyor 10' includes multiple wheel sets 40 (or alternatively multiple wheel sets 40') positioned between the chains 52 in the same manner as the wheel sets 40 of FIG. 1 (or alternatively the arrangement of the wheel sets 40' of FIG. 4).

A lumber piece 20 received at position A is transported by the chains 52 (which are aided by gravity) toward and onto the wheel sets 40 (alternatively wheel sets 40') to position B. The lumber piece 20 is now elevated off the chains 52 and continues to travel due to the force of gravity. As the lumber piece 20 continues, the wheels 30 will be urged to rotate and will transfer the lumber piece 20 laterally. The lumber piece 20 as it progresses through position C will be urged against the side register (not shown in FIG. 7). As the lumber piece exits the wheel sets 40 to position D, the chains 52 will again be in contact with the underside of the lumber piece 20 to continue the conveyance of the lumber piece 20 in the direction indicated by arrow 11.

Those skilled in the art will recognize that modifications and variations may be made without departing from the true scope and spirit of the invention. The invention is therefore not to be limited to the detailed description and drawings but is to be determined from the appended claims.

What is claimed is:

1. In combination with a conveyor for conveying pieces of lumber along a substantially longitudinal path, an even ending lumber apparatus, comprising:

a conveyor for conveying lumber pieces and defining a directed path of conveyance, a register mounted on one side of the conveyor;

an assembly of non-powered rotatable idler wheels cooperatively mounted on the conveyor, a rotational axis of said idler wheels at a common angle to the direction of conveyance and defining a rotative direction of the idler wheels toward the register, a periphery of said wheel extending upward into the directed path a sufficient distance to be engageable with the lumber pieces as they are conveyed on said conveyor whereby the engagement by the lumber pieces moving in the direction of conveyance causes rotation of the idler wheels which urges movement of the lumber pieces against the register.

2. An even ending lumber apparatus as defined in claim 1, wherein:

said wheels and said lumber piece when in engagement in combination provide a sufficient force urging said lumber piece to move transverse to said path of conveyance to overcome a force resisting the transverse movement.

3. An even ending lumber apparatus as defined in claim 2, wherein:

said assembly of idler wheels comprises multiple wheel sets, said wheel sets mounted in a row across a width of said conveyor.

4. An even ending lumber apparatus as defined in claim 3, wherein:

multiple idler wheels are freely independently rotatably mounted on each of said wheel sets.

5. An even ending lumber apparatus as defined in claim 4, further including:

bearings, said bearings rotatably supporting said wheels, said bearings of the low friction type that provide minimum resistance to rotation.

6. An even ending lumber apparatus as defined in claim 5, wherein:

certain of said wheels of said row of said wheel sets simultaneously engage said lumber piece to urge said lumber piece to move transverse to said path of conveyance.

7. An even ending lumber apparatus as defined in claim 6, wherein:

said wheel sets are mounted at an angle to said path of conveyance.

8. An even ending lumber apparatus as defined in claim 6, wherein:

said wheel sets are mounted substantially parallel to said path of conveyance, said wheels of said parallel wheel sets mounted at an angle to said path of conveyance.

9. An even ending lumber apparatus as defined in claim 6, wherein:

said wheels are about ¾ inch in width and about 2-¼ inch in diameter.

* * * * *